(12) United States Patent
Saeki et al.

(10) Patent No.: US 7,164,976 B2
(45) Date of Patent: Jan. 16, 2007

(54) CONTROL APPARATUS FOR FUEL CELL VEHICLE

(75) Inventors: Hibiki Saeki, Utsunomiya (JP); Satoshi Aoyagi, Kawachi-gun (JP); Yoshinobu Hasuka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/723,942

(22) Filed: Nov. 26, 2003

(65) Prior Publication Data
US 2004/0172206 A1 Sep. 2, 2004

(30) Foreign Application Priority Data
Nov. 29, 2002 (JP) ............................. 2002-347148

(51) Int. Cl.
G06F 7/00 (2006.01)
G06F 17/00 (2006.01)
B60I 11/00 (2006.01)

(52) U.S. Cl. ............................. 701/22; 429/12; 429/21; 429/22; 702/63; 180/65.2

(58) Field of Classification Search .................. 701/22, 701/101; 429/13, 17, 21–22, 12, 23; 180/65.2, 180/65.3, 65.4, 165; 702/63
See application file for complete search history.

(56) References Cited

U.S. PATENT DOCUMENTS 4,369,235 A * 1/1983 Bursell .......................... 429/27
5,248,566 A * 9/1993 Kumar et al. .................. 429/19

(Continued)

FOREIGN PATENT DOCUMENTS

EP 406831 A1 * 1/1991

(Continued)

OTHER PUBLICATIONS

Edlund, D. and W.A. Pledger, An integrated fuel processor for PEM fuel cells, Northwest Power Systems, LLC, Bend, Oregon.*

(Continued)

Primary Examiner—Cuong Nguyen
(74) Attorney, Agent, or Firm—Lahive & Cockfield, LLP; Anthony A. Laurentano, Esq.

(57) ABSTRACT

A control apparatus 20 is provided in order to improve the energy efficiency of a vehicle during regeneration by a propulsion motor. At the time of regenerative operation of a propulsion motor 15, calculates the regenerative electric power which can be generated based on the speed of the vehicle or the like, and calculates the chargeable power which can be charged to a capacitor 13 based on the detected value of the terminal voltage of the capacitor 13 or the like. Then, the control apparatus 20, in the case where the chargeable power is greater than the regenerative electric power, sets the fuel cell 11 and the capacitor 13 to a directly connected condition, and outputs to an S/C output controller 17 a power generation command corresponding to the detection value of the terminal voltage of the capacitor 13 which has become the same value as the output voltage of the fuel cell 11, to perform supply of reactant gas in accordance with the power generation command, so that the capacitor 13 is charged by the power generation power of the fuel cell 11 and the regenerative electric power of the propulsion motor 15. In the case where the chargeable power is less than the regenerative electric power, the control apparatus 20 electrically disconnects the fuel cell 11 and the capacitor 13, and prohibits charging of the capacitor 13 by the power generation power of the fuel cell 11.

3 Claims, 3 Drawing Sheets

U.S. PATENT DOCUMENTS

| | | | | |
|---|---|---|---|---|
| 5,366,821 | A | * | 11/1994 | Merritt et al. ............... 429/21 |
| 5,512,145 | A | * | 4/1996 | Hollenberg ................ 205/628 |
| 5,602,279 | A | * | 2/1997 | Thaler et al. ............... 562/526 |
| 5,759,712 | A | * | 6/1998 | Hockaday .................... 429/30 |
| 5,843,395 | A | * | 12/1998 | Wang ....................... 423/573.1 |
| 5,927,416 | A | * | 7/1999 | del Re et al. ............. 180/65.2 |
| 6,019,183 | A | * | 2/2000 | Shimasaki et al. .......... 180/165 |
| 6,326,763 | B1 | | 12/2001 | King et al. |
| 6,348,278 | B1 | * | 2/2002 | LaPierre et al. ............. 429/17 |
| 6,458,478 | B1 | * | 10/2002 | Wang et al. .................. 429/17 |
| 6,480,767 | B1 | * | 11/2002 | Yamaguchi et al. .......... 701/22 |
| 6,521,369 | B1 | * | 2/2003 | Mercuri et al. .............. 429/40 |
| 6,627,340 | B1 | * | 9/2003 | Ovshinsky et al. ........... 429/20 |
| 6,686,084 | B1 | * | 2/2004 | Issacci et al. ................. 429/34 |
| 6,808,832 | B1 | * | 10/2004 | Suzuki et al. ................. 429/13 |
| 6,841,292 | B1 | * | 1/2005 | Nelson et al. ................ 429/90 |
| 6,893,757 | B1 | * | 5/2005 | Kato ........................... 429/23 |
| 6,908,700 | B1 | * | 6/2005 | Iio ............................... 429/17 |
| 6,973,393 | B1 | * | 12/2005 | Hasuka et al. ................ 702/63 |
| 2002/0109406 | A1 | | 8/2002 | Aberle et al. |

FOREIGN PATENT DOCUMENTS

| | | | | |
|---|---|---|---|---|
| EP | 578837 | A1 | * | 1/1994 |
| EP | 1 207 578 | A2 | | 5/2002 |
| JP | 07-245808 | | | 9/1995 |
| JP | 2001-357865 | | | 12/2001 |
| JP | 2002-034171 | | | 1/2002 |
| JP | 2002260696 | A | * | 9/2002 |
| JP | 2004180475 | A | * | 6/2004 |
| WO | WO-01/34424 | A1 | | 5/2001 |
| WO | WO-02/11267 | A2 | | 2/2002 |

OTHER PUBLICATIONS

Bromberg, L. et al., Plasma reforming of diesel fuel, Proc. of the 1999 US DOE Hydrogen Program Review, NREL/CP-570-2693.*

Berlowitz, P. J. et al., Fuel choices for fuel cell powered vehicles, Society of Automotive Engineers, Paper 2000-02-0003.*

Tomy Sebastian et al., Comparison of dual-converter-based power supply systems, IEEE Trans. on Industry Applications, Mar. 1989, pp. 339-347 (from Dialog(R) File 8, acc. no. 02803305).*

Copy of Japanese Office Action transmitted on Jun. 6, 2006 in corresponding appliction JP 2002-347148.

* cited by examiner

CONTROL APPARATUS FOR FUEL CELL VEHICLE

BACKGROUND OF THE INVENTION

Priority is claimed to Japanese application No. 2002-347148, filed Nov. 29, 2002, which is incorporated herein by reference.

1. Field of the Invention

The present invention relates to a control apparatus for a fuel cell vehicle.

2. Description of the Related Art

A solid polymer membrane fuel cell conventionally comprises, for example, cells formed by sandwiching a solid polymer electrolyte membrane between a fuel electrode (anode) and an oxygen electrode (cathode), with a plurality of such cells arranged in a stack. Hydrogen is supplied to the fuel electrode as fuel, and air is supplied to the oxygen electrode as oxidant, and hydrogen ions generated by a catalytic reaction at the fuel electrode pass through the solid polymer electrolyte membrane and migrate to the oxygen electrode, causing an electrochemical reaction with the oxygen at the oxygen electrode, and generating electricity.

As a fuel cell vehicle provided with such a fuel cell as a source of motive power, heretofore there is known a fuel cell vehicle, fitted with a capacitor comprising for example an electric double layer capacitor or an electrolytic capacitor or the like, and constructed so as to store the electrical energy generated by the fuel cell, and transfer electrical energy to the propulsion motor (see for example, Patent document 1).

In such a fuel cell vehicle, the capacitor is connected in parallel to the fuel cell via an output controller which controls the output current and output voltage of the fuel cell, and output control action such as chopping action or the like of the output controller which comprises, for example, a chopper type power conversion circuit, is controlled corresponding to the state of, for example, the fuel cell vehicle, the fuel cell, or the capacitor.

[Patent document 1] Japanese Unexamined Patent Application, First Publication No. 2001-357865.

In practice, at the time of travelling and the like of the fuel cell vehicle according to the example of the aforementioned technology, in the case of a condition where the output current extracted from the fuel cell is not restricted by the output controller, that is the fuel cell and the capacitor are in a directly connected condition, the terminal voltage of the capacitor and the output voltage of the fuel cell become the same value.

Therefore, if for example the capacitor is charged by the regeneration of the propulsion motor, then both the terminal voltage of the capacitor and the output voltage of the fuel cell increase. At this time the setting is such that a command value for the output current corresponding to the increased output voltage based on predetermined power generation characteristics for the output current and output voltage, is input to the fuel cell, so that the relative relationship for the output current and the output voltage does not deviate from a predetermined power generation characteristic.

However, in the case where during regeneration of the propulsion motor, the power generation of the fuel cell continues, and for example the regenerative electric power of the propulsion motor is greater than the chargeable power which can be charged to the capacitor, there is the possibility that unnecessary power generation continues, so that the energy efficiency of the fuel cell vehicle drops.

SUMMARY OF THE INVENTION

The present invention takes into consideration the above situation with the object of providing a control apparatus for a fuel cell vehicle which can improve the energy efficiency of a fuel cell vehicle during regeneration by the propulsion motor.

To solve the aforementioned problems and achieve the related object, a control apparatus for a fuel cell vehicle according to a first aspect of the present invention is a control apparatus for a fuel cell vehicle provided with: a propulsion motor capable of driving a vehicle; a fuel cell furnished with a plurality of fuel cell units made by clamping an electrolyte from both side with a fuel electrode and an oxygen electrode, and which generates electricity by supplying a reactant gas to give an electrochemical reaction; a capacitor which is charged by a generated output of the fuel cell and regenerated electric power of the propulsion motor; a reactant gas supply device (for example the S/C output controller 17, the air compressor 18, the hydrogen tank 19*a*, the hydrogen supply valve 19*b*, and the control apparatus 20 in the embodiment) which supplies the reactant gas to the fuel cell; and an output control device (for example the current and voltage controller 12 in the embodiment) which controls an output current and an output voltage of the fuel cell, characterized in comprising: a regenerative electric power calculating device (for example, step S04 in the embodiment) which calculates the regenerative electric power which can be generated by regenerative operation of the propulsion motor; and a chargeable power calculating device (for example, step S05 in the embodiment) which calculates the chargeable power which can be charged to the capacitor, and when the chargeable power is less than the regenerative electric power, the output control device restricts the value of the output current from the fuel cell to zero, and when the chargeable power is greater than the regenerative electric power, the output control device cancels the restriction on the output current of the fuel cell.

According to the control apparatus for a fuel cell vehicle of the above configuration, in the case where the chargeable power which can be charged to the capacitor is greater than the regenerative electric power which can be generated by the regenerative operation of the propulsion motor, the restriction on the output current of the fuel cell is cancelled, so that the capacitor can be promptly charged by the power generation of the fuel cell and by the regenerative operation of the propulsion motor.

On the other hand, when the chargeable power is less than the regenerative electric power, the output current of the fuel cell is restricted to zero, to thereby prevent the capacitor being over charged by the power generation of the fuel cell, and thus enable the energy efficiency of the fuel cell vehicle during regenerative operation of the propulsion motor to be improved.

Furthermore, a control apparatus for a fuel cell vehicle according to a second aspect of the present invention is a control apparatus for a fuel cell vehicle provided with: a propulsion motor capable of driving a vehicle; a fuel cell furnished with a plurality of fuel cell units made by clamping an electrolyte from both side with a fuel electrode and an oxygen electrode, and which generates electricity by supplying a reactant gas to give an electrochemical reaction; a capacitor which accumulates generated energy of the fuel cell and performs transfer of electrical energy with the propulsion motor; a reactant gas supply device (for example the S/C output controller 17, the air compressor 18, the hydrogen tank 19*a*, the hydrogen supply valve 19*b*, and the control apparatus 20 in the embodiment) which supplies the reactant gas to the fuel cell; an output control device (for example the current and voltage controller 12 in the embodiment) which controls an output current and an output voltage of the fuel cell, and an output control device (for example the current and voltage controller 12 in the embodiment) which controls an output current and an output voltage of the fuel cell, characterized in comprising: a regenerative electric power calculating device (for example, step S04 in the embodiment) which calculates the regenerative electric power which can be generated by regenerative operation of the propulsion motor; a chargeable power calculating device (for example, step S05 in the embodiment) which calculates the chargeable power which can be charged to capacitor; and a voltage detection device (for example the anode voltage sensor 22 in the embodiment) which detects the voltage of the reactant gas supplied to the fuel electrode of the fuel cell, and in the case where the chargeable power is less than the regenerative electric power and the pressure of the reactant gas at the fuel electrode of the fuel cell is less than a predetermined pressure, the reactant gas supply device stops supply of the reactant gas to the oxygen electrode of the fuel cell, and the output control device restricts the value of the output current of the fuel cell to zero, and in the case where the chargeable power is greater than the regenerative electric power, and the chargeable power is less than the regenerative electric power and the pressure of the reactant gas at the fuel electrode of the fuel cell is greater than a predetermined pressure, the output control device cancels the restriction on the output current of the fuel cell.

According to the control apparatus for a fuel cell vehicle of the above configuration, in the case where the chargeable power which can be charged to the capacitor is greater than the regenerative electric power which can be generated by the regenerative operation of the propulsion motor, the restriction on the output current of the fuel cell is cancelled, so that the capacitor can be promptly charged by the power generation of the fuel cell and by the regenerative operation of the propulsion motor. Furthermore, in the case where the pressure of the reactant gas at the fuel electrode of the fuel cell is greater than the predetermined pressure, even though the chargeable output power is less than the regenerative output power, the restriction on the output current of the fuel cell is cancelled, and reactant gas is supplied to the oxygen electrode by means of a power generation command corresponding to the pressure of the reactant gas at the fuel electrode. Moreover, by continuing the power generation, the electrode gap differential pressure due to the reactant gas between the fuel electrode and the oxygen electrode of the fuel cell can be prevented from increasing excessively.

On the other hand, when the chargeable power is less than the regenerative electric power and the pressure of the reactant gas at the fuel electrode of the fuel cell is less than a predetermined pressure, supply of the reactant gas to the oxygen electrode of the fuel cell is stopped, and the output current of the fuel cell is restricted to zero. As a result, excessive charging of the capacitor due to the power generation of the fuel cell can be prevented, and the energy efficiency of the fuel cell vehicle at the time of regenerative operation of the propulsion motor can be improved. Furthermore, by restricting the output current to zero by means of the output control device, a situation where power generation stops due to the pressure of the reactant gas at the fuel electrode becoming less than the predetermined pressure, or an excessive current is extracted from the restricted fuel cell, can be prevented, so that the fuel cell can be maintained in an appropriate condition.

DETAILED DESCRIPTION OF THE INVENTION

The following describes a control apparatus for a fuel cell vehicle according to an embodiment of the present invention, with reference to the appended drawings.

Figure 1:
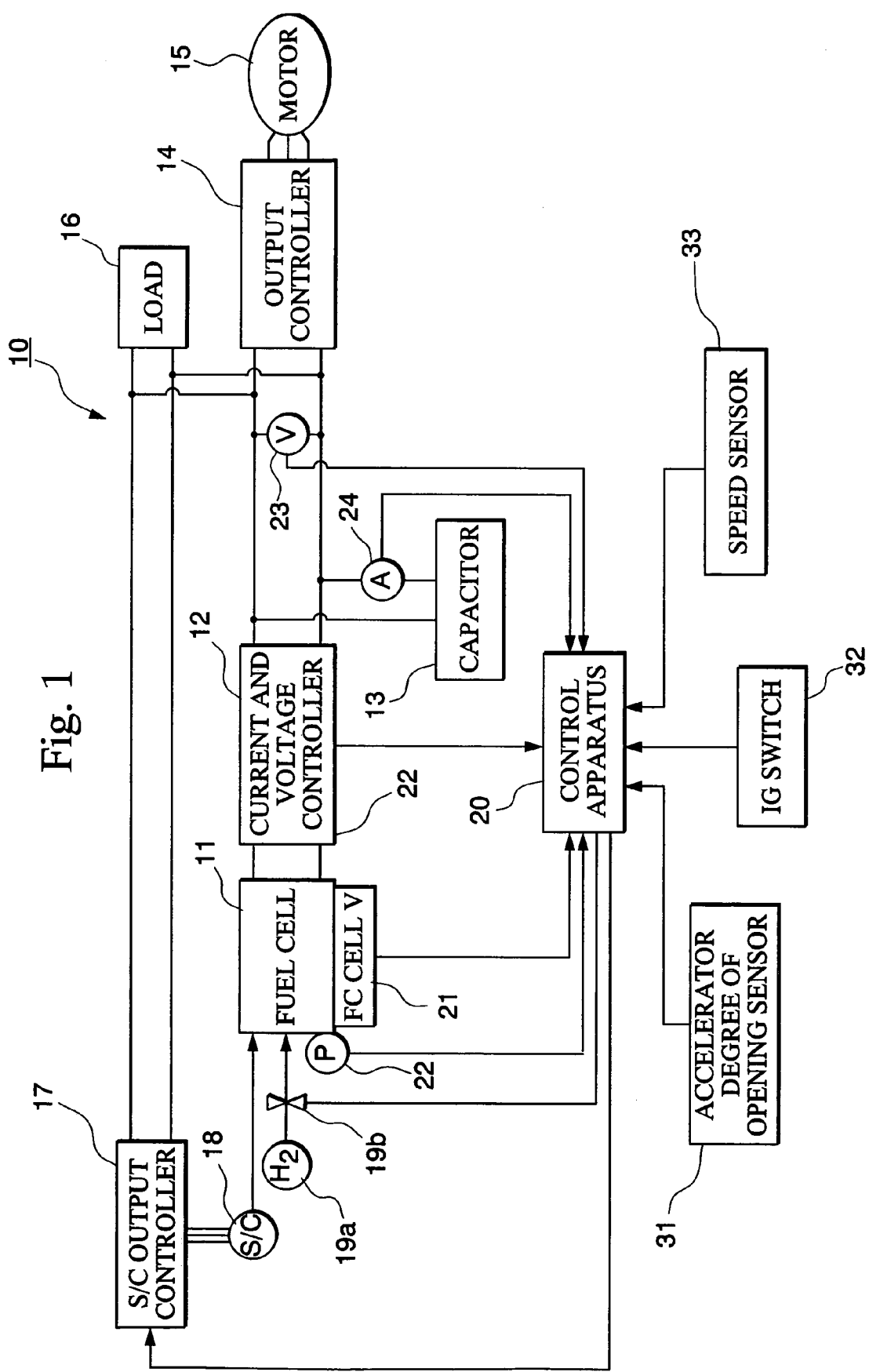
FIG. 1 is a block diagram of a control apparatus for a fuel cell vehicle according to an embodiment of the present invention.

A control apparatus 10 for a fuel cell vehicle according to the present embodiment comprises for example as shown in FIG. 1; a fuel cell 11, a current and voltage controller 12, a capacitor 13, an output controller 14, a propulsion motor 15, a load 16, an S/C output controller 17, an air compressor (S/C) 18, a hydrogen tank 19a and hydrogen supply valve 19b, a control apparatus 20, a fuel cell unit voltage sensor 21, an anode voltage sensor 22, a capacitor voltage sensor 23, a capacitor current sensor 24, an degreeof opening of the accelerator sensor 31, an IG switch 32, and a speed sensor 33.

The fuel cell 11 comprises a stack of fuel cell units made up with an electrolyte electrode structure holding a solid polymer electrolyte membrane formed from a positive ion exchange membrane or the like sandwiched between a fuel electrode (anode) formed from an anode catalyst and gas diffusion layer, and an oxygen electrode (cathode) formed from a cathode catalyst and gas diffusion layer, which is further sandwiched between a pair of separators.

The anode of the fuel cell 11 is supplied with fuel gas (reactant gas) comprising hydrogen, from the high-pressure hydrogen tank 19a via the hydrogen supply valve 19b. Hydrogen ionized by the catalytic reaction on the anode catalyst of the anode migrates to the cathode via an appropriately humidified solid polymer electrolyte membrane, and electrons released in association with this migration are extracted to an external circuit and used as DC electrical energy. The cathode is supplied with, for example, air as an oxidizing gas (reactant gas) containing oxygen, by the air compressor (S/C) 18, and the hydrogen ions, electrons, and oxygen react at the cathode to form water.

The generated current (output current) extracted from the fuel cell 11 is input to the current and voltage controller 12. The current and voltage controller 12 is connected to a capacitor 13 comprising, for example, multiple capacitor cells formed from electric double layer capacitors or electrolytic capacitors or the like connected mutually in series.

The fuel cell 11, the current and voltage controller 12, and the capacitor 13 are connected in parallel to the propulsion motor 15 via the output controller 14, the load 16 comprising various auxiliary equipment, for example, a cooling device for the fuel cell 11 and the capacitor 13 (not shown in drawings) and an air conditioner (not shown in drawings), and the air compressor (S/C) 18 via the S/C output controller 17.

The current and voltage controller 12 comprises, for example, a chopper type power conversion circuit wherein the value of the output current extracted from the fuel cell 11 is controlled by the chopping action of the chopper type power conversion circuit, in other words, by the on/off action of a switching device provided in the chopper type power conversion circuit. This chopping action is controlled in accordance with a duty ratio, in other words, on/off ratio, of the control pulse input from the control apparatus 20.

For example, when the extraction of output current from the fuel cell 11 is prevented, setting the duty ratio of the control pulse input from the control apparatus 20 to 0% results in the switching device provided in the chopper type power conversion circuit being held in the off condition, and the fuel cell 11 and the capacitor 13 are electrically disconnected. On the other hand, setting the duty ratio of the control pulse to 100% results in the switching device being held in the on condition, in effect directly connecting the fuel cell 11 and the capacitor 13. Thus the output voltage of the fuel cell 11 and the capacitor 13 terminal voltage assume the same value.

Furthermore, when the duty ratio of the control pulse is set appropriately between 0% and 100%, the current and voltage controller 12 restricts the output current of the fuel cell 11, in other words, the primary current, as appropriate in accordance the duty ratio of the control pulse, and the restricted current thus obtained is output as the secondary current.

The output controller 14 is provided with, for example, a PWM inverter which uses pulse width modulation (PWM), and controls the drive and regenerative action of the propulsion motor 15 corresponding to control commands output from the control apparatus 20. For example, when the propulsion motor 15 is driven, DC power output from the current and voltage controller 12 and the capacitor 13 is converted to three-phase AC power based on a torque command input from the control apparatus 20, and supplied to the propulsion motor 15. On the other hand, during regeneration with the propulsion motor 15, the three-phase AC power output from the propulsion motor 15 is converted to DC power and supplied to the capacitor 13 to charge the capacitor 13.

The propulsion motor 15 is, for example, a permanent magnet type three-phase AC synchronous motor using a permanent magnet as a field magnet, and is driven and controlled with three-phase AC power supplied from the output controller 14. Additionally, when drive power is transmitted to the propulsion motor 15 from the drive wheels during deceleration of the vehicle, the propulsion motor 15 functions as a generator, producing so called regenerative braking power, recovering the kinetic energy of the vehicle in the form of electrical energy.

Moreover, the air compressor 18 takes, for example, air from outside the vehicle, compresses it, and supplies this air to the cathode of the fuel cell 11 as reactant gas.

The speed of rotation of the motor (not shown in drawings) driving this air compressor 18 is controlled by the S/C output controller 17, provided with, for example, a PWM inverter which uses pulse width modulation (PWM), based on control commands output from the control apparatus 20.

The control apparatus 20 outputs a command value for the flow of the reactant gas supplied from the air compressor 18 to the fuel cell 11, and a command value for the opening of the hydrogen supply valve 19b, based on, for example, the operating state of the vehicle, the concentration of hydrogen in the reactant gas supplied to the anode of the fuel cell 11, the concentration of hydrogen in the gas discharged from the anode of the fuel cell 11, and the state of power generation of the fuel cell 11, for example, the terminal voltage of each of the multiple fuel cell units, the output current extracted from the fuel cell 11, the pressure of reactant gas supplied to the anode, and the like, to thereby control the state of power generation of the fuel cell 11.

Furthermore, the control apparatus 20 outputs control pulses to control the power conversion operation of the current and voltage controller 12, based on a power generation command for the fuel cell 11, to thereby control the value of the current output from the fuel cell 11.

Moreover, the control apparatus 20 controls the power conversion operation of the PWM inverter provided in the output controller 14, and when, for example, the propulsion motor 15 is driven, computes a torque command based on a signal for the degree of opening of the accelerator associated with the amount of pressing of the accelerator pedal by the driver. The control apparatus 20 then inputs this torque command to the output controller 14. As a result, a pulse width modulation signal corresponding to the torque command is input to the PWM inverter, and various phase currents required to produce the requested torque are output to each phase of the propulsion motor 15.

Furthermore, the control apparatus 20 controls the regenerative operation of the propulsion motor 15 based on the travelling state of the vehicle, for example the speed of the vehicle (speed), or the state of the capacitor 13, for example, the temperature of the capacitor 13, the total voltage being the sum of the capacitor unit voltages of the multiple capacitor units, in other words, the detected value of the terminal voltage of the capacitor 13, the detected value of the current charged to the capacitor 13, or the like.

Therefore to the control apparatus 20 is input for example: a detection signal output from the fuel cell unit voltage sensor 21 which detects the terminal voltage (fuel cell unit voltage) of the multiple fuel cell units comprising the fuel cell 11; a detection signal output from the output current sensor (not shown in drawings) which detects the value of the output current extracted from the fuel cell 11; a detection signal output from the output voltage sensor (not shown in drawings) which detects the output voltage of the fuel cell 11; a detection signal output from the capacitor voltage sensor 23 which detects the terminal voltage of the capacitor 13; a detection signal output from the capacitor current sensor 24 which detects the capacitor current charged to the capacitor 13; a detection signal output from the capacitor temperature sensor (not shown in drawings) which detects the temperature of the capacitor 13; a detection signal output from the degree of opening of the accelerator sensor 31; a signal output from the IG switch 32 which instructs commencement of operation of the vehicle, and a detection signal output from the speed sensor 33.

Moreover, as described below, the control apparatus 20, at the time of regenerative operation of the propulsion motor 15 such as during deceleration of the fuel cell vehicle, calculates the regenerative electric power which can be generated based on the vehicle condition, for example on the speed of the vehicle or the like. Furthermore, the control apparatus 20 calculates the chargeable power which can be charged to the capacitor 13 based for example on the detected value of the terminal voltage of the capacitor 13 or the like.

Then, the control apparatus 20, in the case where the chargeable power which can be charged to the capacitor 13 is greater than the regenerative electric power which can be generated by the propulsion motor 15, makes the duty ratio of the control pulse output to the current and voltage controller 12, 100%, and sets the fuel cell 11 and the capacitor 13 to a directly connected condition. Moreover, the control apparatus 20 outputs to the S/C output controller 17 a power generation command corresponding to the detection value of the terminal voltage of the capacitor 13 which has become the same value as the output voltage of the fuel cell 11, to perform supply of reactant gas in accordance with the power generation command, so that the capacitor 13 is charged by the power generation power of the fuel cell 11 and the regenerative electric power of the propulsion motor 15.

On the other hand, in the case where the chargeable power which can be charged to the capacitor 13 is less than the regenerative electric power which can be generated by the propulsion motor 15, the control apparatus 20 makes the duty ratio of the control pulse input to current and voltage controller 12, 0%, to electrically disconnect the fuel cell 11 and the capacitor 13, and prohibit charging of the capacitor 13 by the power generation power of the fuel cell 11.

The control apparatus 10 for a fuel cell vehicle according to the present embodiment has the aforementioned configuration. Next is a description of the operation of the control apparatus 10 for a fuel cell vehicle, in particular the operation during travelling of the fuel cell vehicle, with reference to the appended drawings.

Figure 2:
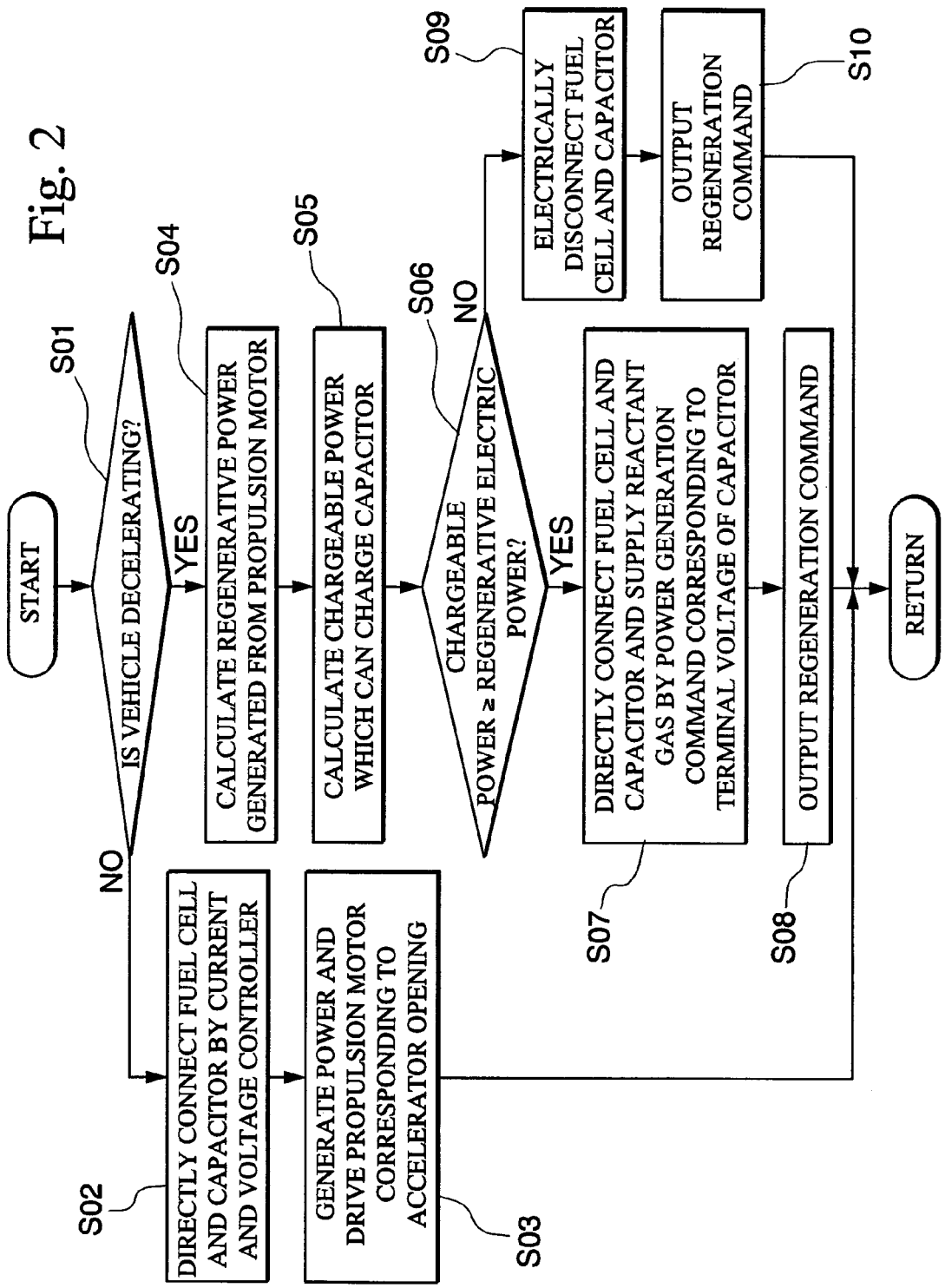
FIG. 2 is a flow chart showing an operation of the control apparatus for a fuel cell vehicle shown in FIG. 1.

At first, in step S01 of FIG. 2, it is determined whether or not the fuel cell vehicle is decelerating, according to for example a time change of the opening of the accelerator related to the accelerator operation amount of the driver, or for example the direction of the current being charged to the capacitor 15, that is whether this is a charging current or a discharge current, or the like.

If the determination result is YES, the flow proceeds to the next step S04.

On the other hand if the determination result is NO, the flow proceeds to step S02.

In step S02, the duty ratio of the control pulse input to current and voltage controller 12 is set to 100%, and the fuel cell 11 and the capacitor 13 are set to a directly connected condition.

Then, in step S03, a power generation command corresponding for example to the degreeof opening of the accelerator related to the accelerator operation amount of the driver or the like, is output to the S/C output controller 17, and also a torque command corresponding to the degreeof opening of the accelerator or the like is output to the output controller 14, so that the propulsion motor 15 is driven by the power supply from the fuel cell 11, and this series of processing then ends.

Furthermore, in step S04, based on the vehicle travelling conditions, for example the speed of the vehicle or the like, the regenerative electric power which can be generated by the regenerative operation of the propulsion motor 15 is calculated.

Next, in step S05, based for example on the detection value of the terminal voltage of the capacitor 13 or the like, the chargeable power which can be charged to the capacitor 13 is calculated.

Then, in step S06, it is determined whether or not the chargeable power which can be charged to the capacitor 13 is greater than the regenerative electric power which can be generated by the propulsion motor 15.

In the case where the determination result is NO, the flow proceeds to the next step S09.

On the other hand, in the case where the determination result is YES, the flow proceeds to step S07.

In step S07, the duty ratio of the control pulse output to the current and voltage controller 12 is set to 100%, and the fuel cell 11 and the capacitor 13 are set to the directly connected condition, and also a power generation command corresponding to the detection value of the terminal voltage of the capacitor 13 which has become the same value as the output voltage of the fuel cell 11, is output to the S/C output controller 17, and supply of reactant gas is performed corresponding to the power generation command for the fuel cell 11, so that the capacitor 13 is charged by the power generation power of the fuel cell 11.

Then, in step S08, a regeneration command is output to the output controller 14, and the three phase AC power output from the propulsion motor 15 due to the regeneration operation, is converted to DC regenerative electric power by the output controller 14, and the capacitor 13 is charged by this regenerative electric power, and the series of processing ends.

Furthermore, in step S09, the duty ratio of the control pulse input to current and voltage controller 12 is set to 0%, and the fuel cell 11 and the capacitor 13 are electrically disconnected, so that charging of the capacitor 13 by means of the power generation power of the fuel cell 11 is prohibited.

Then, in step S10, a regeneration command is output to the output controller 14, and the three phase AC power output from the propulsion motor 15 due to the regenerative operation is converted to DC regenerative power by the output controller 14, and the capacitor 13 is charged by this regenerative electric power, and the series of processing ends.

As described above, according to the control apparatus 10 for a fuel cell vehicle of this embodiment, in the case where the chargeable power which can be charged to the capacitor 13 is greater than the regenerative electric power which can be generated by the regeneration operation of the propulsion motor, the restriction on the output current of the fuel cell 11 is cancelled, so that the capacitor 13 can be quickly charged by the power generation power of the fuel cell 11 and the regenerative electric power of the propulsion motor 15.

On the other hand, when the chargeable power is less than the regenerative electric power, the output current of the fuel cell 11 is restricted to zero. As a result the capacitor being over charged by the power generation of the fuel cell can be prevented, and the energy efficiency of the fuel cell vehicle during regenerative operation of the propulsion motor 15 can be improved.

In the above described embodiment, in the case where the chargeable power which can be charged to the capacitor 13 is less than the regenerative electric power which can be generated by the propulsion motor 15, charging of the capacitor 13 by the power generation power of the fuel cell 11 is simply prohibited. However, this is not limiting, and for example as in the flow chart shown in FIG. 3 showing the operation of the control apparatus 10 for a fuel cell vehicle according to a modified example of the embodiment, the operation of current and voltage controller 12 may further be controlled corresponding to the electrode gap differential pressure of the anode and cathode of the fuel cell 11.

In this modified example of the embodiment, the point different from the above mentioned embodiment is that in the case where the determination result in step S06 is NO, the flow proceeds to step S21.

Hereunder, parts the same as for the above mentioned embodiment are denoted by the same reference symbols, and description is omitted.

Figure 3:
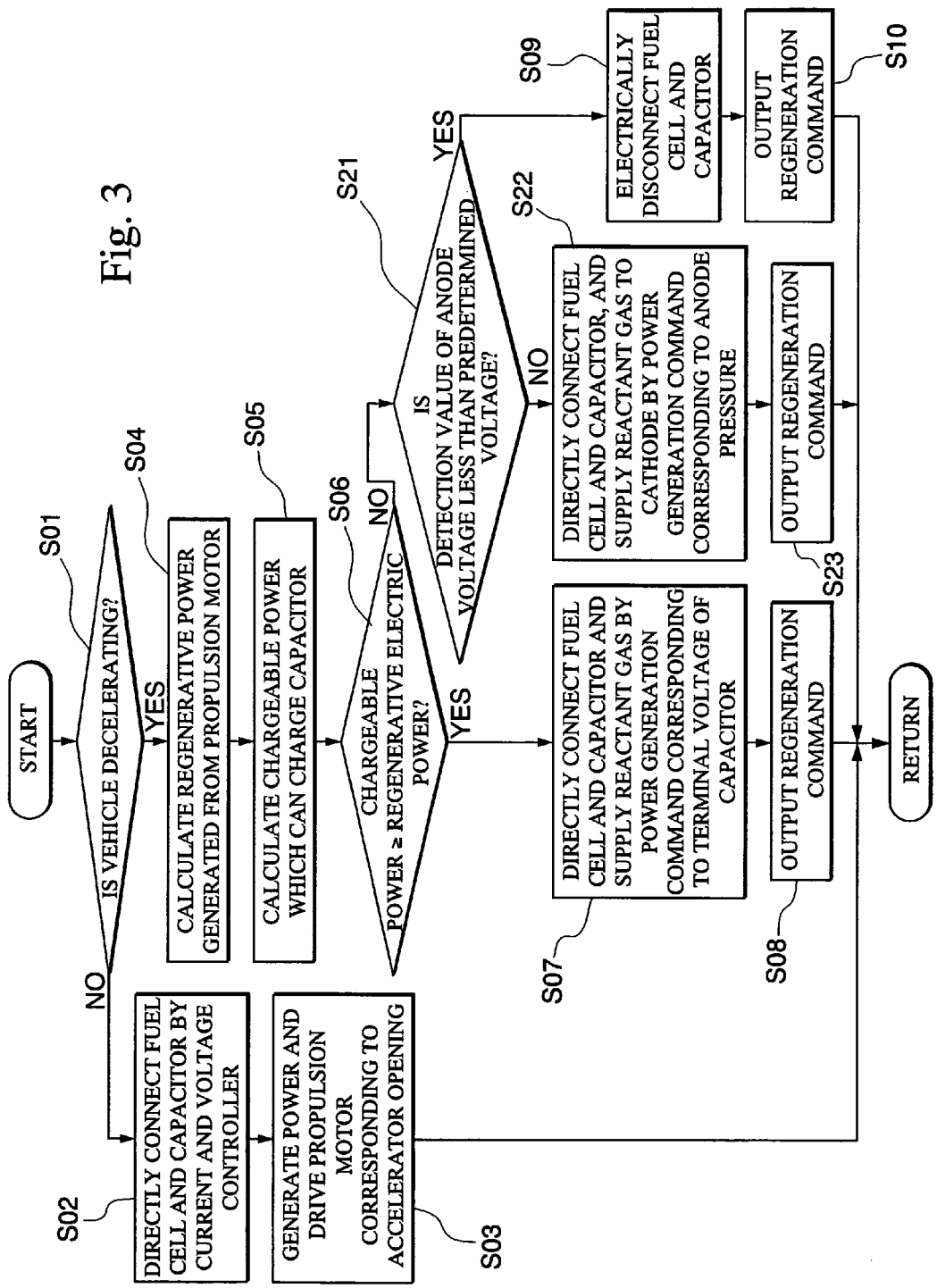
FIG. 3 is a flow chart showing an operation of the control apparatus for a fuel cell vehicle according to a modified example of the present embodiment.

That is to say, in step S21 in FIG. 3, it is determined whether or not the detection result of the pressure (anode pressure) of the reactant gas at the anode of the fuel cell 11 is less than a predetermined pressure.

In the case where the determination result is YES, the flow proceeds to the aforementioned step S09.

On the other hand, in the case where the determination result is NO, the flow proceeds to step S22.

In step S22, the duty ratio of the control pulse input to current and voltage controller 12 is made 100% so that the fuel cell 11 and the capacitor 13 are set to the directly connected condition. Also the power generation command corresponding to the detection value of the anode pressure is output to the S/C output controller 17, and supply of reactant gas (air) is performed corresponding to the power generation command for the cathode of the fuel cell 11, so that power generation is performed in a condition where the differential pressure of the electrode gap of the anode and the cathode of the fuel cell 11 is maintained at a predetermined differential pressure condition, and the capacitor 13 is charged by the power generation power of the fuel cell 11.

Then, in step S23, a regeneration command is output to the output controller 14, and the three phase AC power output from the propulsion motor 15 is converted to DC regenerative power by means of the output controller 14, and the capacitor 13 is then charged by this regenerative electric power, and the series of processing ends.

That is, in the case where the pressure of the hydrogen at the anode of the fuel cell 11 is greater than a predetermined pressure, even though the chargeable power is less than the regenerative electric power, the restriction on the output current of the fuel cell 11 is cancelled so that power generation continues. As a result, an excessive increase in the differential pressure of the electrode gap between the anode and the cathode of the fuel cell 11 can be prevented.

As described above, according to the control apparatus for a fuel cell vehicle of the first aspect of the present invention, the capacitor can be promptly charged by the power generation of the fuel cell and by the regenerative operation of the propulsion motor. Also overcharging of the capacitor by the power generation of the fuel cell can be prevented, thus enabling the energy efficiency of the fuel cell vehicle during regenerative operation of the propulsion motor to be improved.

Moreover according to the control apparatus for a fuel cell vehicle of the second aspect of the present invention, the capacitor can be promptly charged by the power generation of the fuel cell and by the regenerative operation of the propulsion motor. Also, while maintaining protection of the fuel cell, excessive charging of the capacitor due to the power generation of the fuel cell can be prevented, and the energy efficiency of the fuel cell vehicle at the time of regenerative operation of the propulsion motor can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed to:

1. A control apparatus for a fuel cell vehicle comprising:
   a propulsion motor capable of driving a vehicle;
   a fuel cell, composed of a plurality of fuel cell units formed by sandwiching an electrolyte membrane between a fuel electrode and an oxygen electrode, which generates electric power by supplying a reactant gas to give an electrochemical reaction;
   a capacitor which is charged by a generated output of said fuel cell and regenerated electric power of said propulsion motor;
   a reactant gas supply device which supplies said reactant gases to said fuel cell;
   an output control device which receives an output current extracted from said fuel cell and controls said output current of said fuel cell;
   a regenerative electric power calculating device which calculates the regenerative electric power which can be generated by regenerative operation of said propulsion motor; and
   a chargeable power calculating device which calculates the chargeable power which can be charged to said capacitor,
   wherein when said chargeable power is less than said regenerative electric power, said output control device restricts the value of the output current from said fuel cell to zero, and
   when said chargeable power is greater than said regenerative electric power, said output control device cancels the restriction on the output current of said fuel cell.

2. A control apparatus of a fuel cell vehicle comprising:
   a propulsion motor capable of driving a vehicle;
   a fuel cell which generates electric power by supplying a reactant gas to give an electrochemical reaction;
   a capacitor which stores generated energy of said fuel cell and performs transfer of electrical energy with said propulsion motor;
   a reactant gas supply device which supplies said reactant gas to said fuel cell;
   an output control device which controls an output current of said fuel cell;
   a regenerative electric power calculating device which calculates the regenerative electric power which can be generated by regenerative operation of said propulsion motor;
   a chargeable power calculating device which calculates the chargeable power which can be charged to said capacitor; and
   a pressure detection device which detects the pressure of said reactant gas supplied to a fuel electrode of said fuel cell,
   wherein, when said chargeable power is less than said regenerative electric power and the pressure of said reactant gas at the fuel electrode of said fuel cell is less than a predetermined pressure, said reactant gas supply device stops supply of said reactant gas to the oxygen electrode of said fuel cell, and said output control device restricts the value of the output current of said fuel cell to substantially zero, and
   when where said chargeable power is greater than said regenerative electric power and the pressure of said reactant gas at the fuel electrode of said fuel cell is greater than the predetermined pressure, said output control device cancels the restriction on the output current of said fuel cell.

3. A control apparatus of a fuel cell vehicle according to claim 2, wherein said output control device cancels the restriction ante output current of said fuel cell when said chargeable power is less than said regenerative electric power and the pressure of said reactant gas at the fuel electrode of said fuel cell is greater than a predetermined pressure.

* * * * *